__PAGE_START__ 3,828,033
Patented Aug. 6, 1974

3,828,033
PROCESS FOR PREPARING 2-(6-METHOXY-2-NAPHTHYL)PROPIONIC ACID AND INTERMEDIATES THEREFOR
Peter H. Nelson, Los Altos, Calif., assignor to Syntex Corporation, Panama, Panama
No Drawing. Original application Sept. 30, 1969, Ser. No. 862,500, now Patent No. 3,681,432, dated Aug. 1, 1972. Divided and this application Mar. 30, 1972, Ser. No. 239,828
Int. Cl. C09b 23/00; C07c 69/76
U.S. Cl. 260—240 R       5 Claims

ABSTRACT OF THE DISCLOSURE 2-(6-Methoxy-2-naphthyl)propionic acid is prepared by reacting a compound having the formula

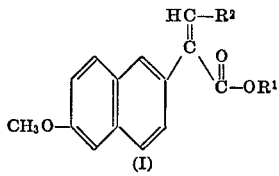

(I)

with hydrogen in the presence of a hydrogenation catalyst until a 2-(6-methoxy-2-naphthyl)propionate is formed, and hydrolyzing the ester group of the propionate. In the formula, $R^1$ is an alkyl, cycloalkyl, aralkyl or alkenyl group and $R^2$ is $-OR^3$, $-SR^3$,

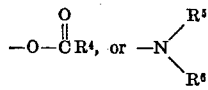

wherein $R^3$, $R^5$ and $R^6$ each is alkyl or cycloalkyl; $R^4$ is alkyl, cycloalkyl, aryl or aralkyl; and $R^5$ and $R^6$ together can be ethylene or a polymethylene group having from 3 to 7 carbons. The product has anti-inflammatory, analgesic, and anti-pyretic activities.

This is a division of application Ser. No. 862,500 filed Sept. 30, 1969, now U.S. Pat. No. 3,681,432.

This invention relates to a process for preparing 2-(6-methoxy-2-naphthyl)propionic acid.

The process of this invention for preparing 2-(6-methoxy-2-naphthyl)propionic acid comprises the steps of (a) reacting a compound having the formula

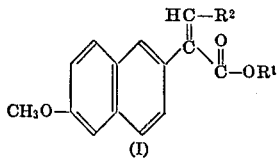

(I)

with hydrogen in the presence of a hydrogenation catalyst until a 2-(6-methoxy-2-naphthyl)propionate is formed, wherein $R^1$ is an alkyl, cycloalkyl, aralkyl or alkenyl group, $R^2$ is $-OR^3$, $-SR^3$,

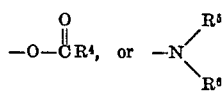

wherein $R^3$, $R^5$, and $R^6$ each is alkyl or cycloalkyl; and $R^4$ is alkyl, cycloalkyl, aryl or aralkyl; and $R^5$ and $R^6$ together can be an ethylene or polymethylene group having from 3 to 7 carbons;
(b) hydrolyzing the ester group of the 2-(6-methoxy-2-naphthyl)propionate; and
(c) separating 2-(6-methoxy-2-naphthyl)propionic acid from the reaction mixture. Preferably, the product is resolved to obtain a 2-(6-methoxy-2-naphthyl)propionic acid as the final product.

The process of this invention can be represented by the following formulas:

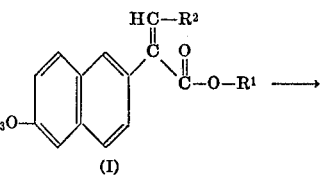

(I)

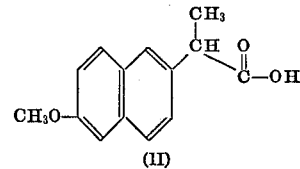

(II)

In the above formulas, $R^1$ and $R^2$ are as previously defined.

The term "alkyl" includes primary, secondary and tertiary alkyl groups of straight and branched chain configuration, preferably having up to 24 carbons. Examples are methyl, ethyl, propyl, isopropyl, n-butyl, n-hexyl, n-decyl, n-dodecyl and the like. The term "cycloalkyl" refers to cyclic hydrocarbon groups and substituted cyclic hydrocarbon groups preferably having from 3 to 8 carbons such as cyclopropyl, cyclopentyl, cyclohexyl, cycloheptyl, cyclooctyl and the like. The term "aryl" refers to unsubstituted and substituted phenyl, naphthyl, anthryl and phenanthryl groups such as phenyl, p-tolyl, p-fluorophenyl, p-chlorophenyl, p-hydroxyphenyl, p-methoxyphenyl, p-methylphenyl, the corresponding o- and m-isomers, and naphthyl, anthryl and phenanthryl groups unsubstituted or substituted at one or more positions with alkyl, halo, hydroxy or alkoxy groups. The term "aralkyl" refers to alkyl groups substituted by one or more alkyl groups having at least 2 carbons and substituted by one or more alkyl groups at a carbon other than the alpha carbon and preferably having up to 10 carbons such as benzyl, 2-phenylethyl, 3-phenylpropyl, 2-phenylpropyl and the like. Alkyl groups substituted at the alpha position by an aryl group which are not stable to hydrogenolysis such as benzyl are not suitable. The term "alkenyl" refers to alkyl groups as previously defined containing unsaturation at one or more locations.

The first step in the process of this invention comprises reacting the compound of Formula I with hydrogen in the presence of a hydrogenation catalyst in a suitable inert organic solvent. The compounds are reacted with at least two molar equivalents of hydrogen in this reaction.

The hydrogenation catalyst should not be susceptible to poisoning by the compound of Formula I. Suitable hydrogenation catalysts include palladium, platinum, nickel (Raney nickel), ruthenium and the like. When the compound of Formula I contains sulfur, larger quantities of catalyst should be used to effect the hydrogenation.

Suitable inert organic solvents include liquid alkanols such as methanol, ethanol, n-propanol, isopropanol etc.; esters such as ethyl acetate; ethers such as diethyl ether; and hydrocarbons such as n-hexane, benzene, toluene, xylene and the like. Halogenated hydrocarbons are not preferred because they usually deactivate the catalyst.

The reaction can be conducted in an acidic, neutral or basic solution. The particular acid or base used in acidic or basic solutions are not critical but are preferably an inorganic acid or base. Preferably, the reaction is conducted under acidic conditions, the solvent containing an acid such as p-toluenesulfonic acid.

The temperature at which the reaction is conducted is not critical. For example, the reaction can be conducted at a temperature of from 0° C. to the boiling temperature of the solvent or higher (if the system is under pressure). The reaction is conducted until a 2-(6-methoxy-2-naphthyl)propionate is formed (until hydrogenolysis occurs), usually from 15 minutes to 48 hours. Two hours is usually sufficient.

The 2-(6-methoxy-2-naphthyl)propionate formed in this reaction is then hydrolyzed to form the free acid by treatment with base followed by acidification or by treatment with a strong acid. For base hydrolysis, a solution of a strong base such as sodium or potassium hydroxide in a suitable solvent such as water is mixed with the 2-(6-methoxy-2-naphthyl)propionate, and the reaction mixture is maintained at a temperature of from 60° C. to reflux temperature until hydrolysis occurs. Usually from 10 minutes to 6 hours is sufficient for this hydrolysis. The reaction mixture is then acidified with an acid such as acetic acid, trifluoroacetic acid, p-toluenesulfonic acid, hydrohydrochloric acid, sulfuric acid, phosphoric acid and the like to release the free acid.

Alternatively, the reaction mixture is mixed with a solution of a strong organic or inorganic acid such as trifluoroacetic acid, p-toluenesulfonic acid, hydrochloric acid, hydrobromic acid, hydroiodic acid, sulfuric acid, phosphoric acid and the like at a temperature of at least 60° C. and preferably from 60 to 100° C. until hydrolysis occurs. Suitable solvents for this reaction include water, lower aliphatic carboxylic acids, lower alkanols and the like.

The product compound of Formula II is then separated from the reaction mixture by conventional procedures. For example, when the reaction mixture is acidified and diluted with water, the compound of Formula II precipitates, and it can be removed by filtration and recrystallized from acetone-hexane. Alternatively, the acid can be removed by extraction with ether or a similar solvent. Chromatography can also be used to purify and isolate the product compound of Formula II.

The preferred product is d 2-(6-methoxy-2-naphthyl)propionic acid. To obtain this product, optical resolution of the compound of Formula II can be achieved by selective biological degradation or by preparation of diastereo isomer salts of the 2-(6-methoxy-2-naphthyl)propionic acid with a resolved optically active amine base such as cinchonidine and then separating the thus formed diastereo isomer salt by fractional crystallization. The separated diastereo isomer salts are then acid cleaved to yield the respective d 2-(6-methoxy-2-naphthyl)propionic acid.

The compounds of Formula I can be prepared by a procedure which can be represented as follows:

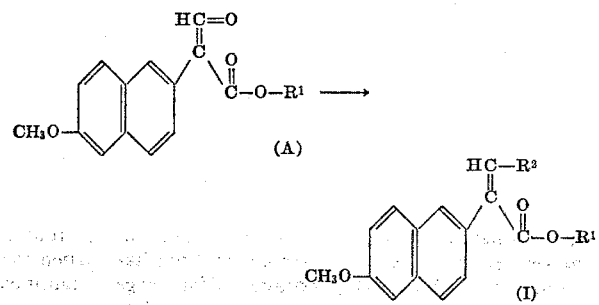

In the above formulas, $R^1$ and $R^2$ are as previously defined.

The compounds of Formula A and procedures for its preparation have been previously described in United States Application Ser. No. 694,771 filed Dec. 7, 1967. One such procedure comprises reacting the respective 6-methoxy-2-naphthylacetic acid ester with an alkali metal or alkali metal hydride and ethyl formate in a suitable inert organic solvent such as benzene, acidifying the reaction mixture and extracting the reaction mixture with benzene. The extracts are combined, washed with water to neutrality, dried over sodium sulfate, and filtered to yield the compound of Formula A.

The compounds of Formula I wherein $R^2$ is $-OR^3$ are prepared by reacting the compound of Formula I with the corresponding alcohol (alkanol or cycloalkanol) at an elevated temperature in the presence of p-toluenesulfonic acid.

The compounds of Formula I wherein $R^2$ is $-SR^3$ are prepared by reacting the compound of Formula I with the corresponding thiol (alkanethiol or cycloalkanethiol) at an elevated temperature in the presence of p-toluenesulfonic acid.

The compounds of Formula I wherein $R^2$ is

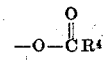

(wherein $R^5$ and $R^6$ are as previously defined) are prepared by reacting the compound of Formula I with a solution of a cyclic amine such as piperidine, azidine, pyrrolidine, and the like or other suitable secondary amines such as dimethylamine, dipropylamine, di(n-hexyl)amine, dicyclohexylamine and the like in a suitable solvent such as a lower alkanol in the presence of p-toluenesulfonic acid.

The compounds of Formula I wherein $R^2$ is $$-O-\overset{O}{\underset{\|}{C}}R^4$$

is prepared by reacting the compound of Formula I with the corresponding carboxylic acid anhydride, either alone or in a suitable solvent such as pyridine, ethers, hydrocarbons and the like.

The compound of Formula II exhibits anti-inflammatory, analgesic and anti-pyretic activities and is accordingly employed in the treatment of inflammation, pain and pyrexia in mammals. For example, inflammatory conditions of the muscular skeletal system, skeletal joints and other tissues can be treated. Accordingly, this compound is useful in the treatment of conditions characterized by inflammation such as rheumatism, concussion, laceration, arthritis, bone fractures, post-traumatic conditions and gout.

This invention is further illustrated by the following specific but non-limiting examples.

EXAMPLE 1

To a mixture of 23 g. of ethyl 6-methoxy-2-naphthyl acetate, 7 g. of sodium hydride, and 150 ml. of benzene, 15 g. of ethylformate is added. The resulting mixture is stirred for 24 hours, and 100 ml. of ethanol is then added. The reaction mixture is then made acidic by the addition of 500 ml. of 1 N hydrochloric acid, and then extracted with benzene. The extracts are combined, washed with water to neutrality, dried over sodium sulfate, and filtered to yield ethyl 2-formyl-2-(6-methoxy-2-naphthyl)propionate.

EXAMPLE 2

A solution of 10 g. of ethyl 2-formyl-2-(6-methoxy-2-naphthyl)propionate in 100 ml. of ethanol containing 0.2 g. of p-toluenesulfonic acid is heated under reflux for 24 hours to form the corresponding enol ether.

To the cooled solution is added 1 g. of 5 percent palladium-on-charcoal catalyst, and the mixture is hydrogenated at 1 atmosphere for 2 hours. The catalyst is removed by filtration, and 10 g. of sodium hydroxide and 10 ml. of water is added. The mixture is then heated under reflux for 2 hours. The resulting mixture is then acidified with dilute hydrochloric acid and further diluted with water to yield 2-(6-methoxy-2-naphthyl)propionic acid. The latter compound precipitates from the solution, and the precipitate is removed by filtration and recrystallized from acetone-hexane.

EXAMPLE 3

A solution of 10 g. of ethyl 2-formyl-2-(6-methoxy-2-naphthyl)propionate in 100 ml. of ethanol containing 10 g. of ethane thiol and 0.2 g. of p-toluenesulfonic acid is heated under reflux for 24 hours to form the corresponding ethyl 2-ethylthiomethylene-2-(6-methoxy-2-naphthyl) propionate.

To the cooled solution of this compound is added 20 g. of Raney nickel, and the mixture is hydrogenated at 10 atmospheres for 48 hours. The catalyst is removed by filtration, and 10 g. of sodium hydroxide and 10 ml. of water is added to the reaction mixture. The mixture is then heated under reflux for 2 hours and acidified with dilute hydrochloric acid. It is then diluted with water to precipitate 2-(6-methoxy - 2 - naphthyl)propionic acid which is removed by filtration and recrystallized from acetone-hexane.

EXAMPLE 4

A solution of 10 g. of ethyl 2-formyl-2-(6-methoxy-2-naphthyl)-propionate in 100 ml. of ethanol containing 10 ml. of pyrrolidine and 0.2 g. of p-toluenesulfonic acid is heated under reflux for 24 hours to form the corresponding ethyl 2-pyrrolidinomethylene-2-(6-methoxy-2-naphthyl)propionate.

To the cooled solution is added 1 g. of 5 percent palladium-on-charcoal catalyst, and the mixture is hydrogenated at 1 atmosphere for 2 hours. The catalyst is removed by filtration and 10 g. of sodium hydroxide and 10 ml. of water are added.

The mixture is then heated under reflux for 2 hours. The reaction mixture is acidified with dilute hydrochloric acid and diluted with water to precipitate 2-(6-methoxy-2-naphthyl)propionic acid which is removed by filtration and recrystallized from acetone-hexane.

EXAMPLE 5

A solution of 10 g. of ethyl 2-formyl-2-(6-methoxy-2-naphthyl)propionate in 30 ml. of acetic anhydride is heated under reflux for 24 hours. Evaporation of the acetic anhydride *in vacuo* yields *cis* and *trans* ethyl 3-acetoxy-2-(6-methoxy-2-naphthyl)acrylate.

This is hydrogenated in 100 ml. of ethanol as described in Example 1 to yield 2-(6-methoxy-2-naphthyl)propionic acid.

EXAMPLE 6

A solution of dl 2-(6-methoxy-2-naphthyl)propionic acid in methanol is prepared by dissolving 230 g. of the product of Example 1 in 4.6 l. of warm methanol. The resulting solution is boiled until it becomes turbid; then sufficient methanol is added to make the solution clear again. This hot solution is added to a solution of 296 g. of cinchonidine in 7.4 l. of methanol heated to about 60° C. The solutions are combined while stirring, and the combined mixture is then allowed to reach room temperature over a 2 hour period. After the reaction mixture has reached room temperature, it is stirred for an additional 2 hours and then filtered. The filtered solids are washed with several portions of cold methanol and dried.

100 Grams of the cinchonidine salt crystals are added to a stirred mixture of 600 ml. of ethyl acetate and 450 ml. of a 2 N aqueous hydrochloric acid. After the mixture has been stirred for 2 hours, the ethyl acetate layer is removed and washed with water to neutrality, dried over sodium sulfate and evaporated to yield d 2-(6-methoxy-2-naphthyl)propionic acid.

I claim:

1. A compound selected from the group of compounds represented by the formula

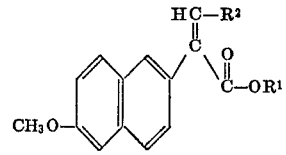

wherein
R$^1$ is an alkyl group having 1 to 24 carbon atoms, or a cycloalkyl group having 3 to 8 carbon atoms; and

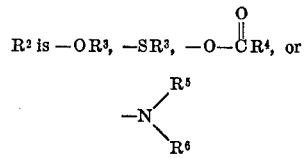

wherein R$^3$, R$^5$ and R$^6$ each is an alkyl group having 1 to 24 carbon atoms or a cycloalkyl group having 3 to 8 carbon atoms; R$^4$ is an alkyl group having 1 to 24 carbon atoms or a cycloalkyl group having 3 to 8 carbon atoms; or R$^5$ and R$^6$ together can be ethylene or a polymethylene group having from 3 to 7 carbons.

2. A compound of Claim 1 wherein R$^2$ is an ethoxy group.

3. A compound of Claim 1 wherein R$^2$ is an ethylthio group.

4. A compound of Claim 1 wherein R$^2$ is a pyrrolidino group.

5. A compound of Claim 1 wherein R$^2$ is an acetoxy group.

References Cited

UNITED STATES PATENTS

| 3,637,767 | 1/1972 | Alvarez | 260—348 R |
| 3,651,148 | 3/1972 | Nelson | 260—606.5 B |
| 3,652,683 | 3/1972 | Harrison | 260—612 D |

OTHER REFERENCES

Karrer, Organic Chemistry, 2nd English Ed., p. 901 and frontispage, Elsevier Pub. Co. Inc. NY (1946).

JOHN D. RANDOLPH, Primary Examiner

U.S. Cl. X.R.

260—470, 471 A, 473 F, 520, 999

UNITED STATES PATENT OFFICE
CERTIFICATE OF CORRECTION

Patent No. 3,828,033　　　　　　　　　Dated August 6, 1974

Inventor(s)　Peter H. Nelson

It is certified that error appears in the above-identified patent and that said Letters Patent are hereby corrected as shown below:

Column 3, lines 50-56, that portion of Formula (A) reading

" 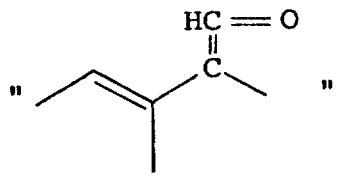 "　should read　-- 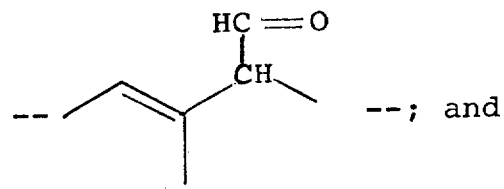 --; and

Column 4, lines 12-15,

" 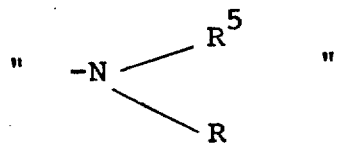 "　should read　-- 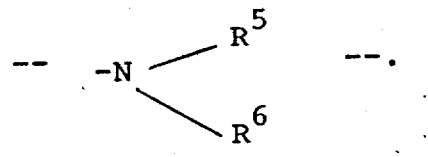 --.

Signed and sealed this 11th day of March 1975.

(SEAL)
Attest:

RUTH C. MASON
Attesting Officer

C. MARSHALL DANN
Commissioner of Patents
and Trademarks